United States Patent [19]
Osborne

[11] Patent Number: 5,202,296
[45] Date of Patent: Apr. 13, 1993

[54] CHEMICALLY TREATED AIR FILTER FOR ENRICHING THE OXYGEN PRESENT IN AN AIRSTREAM

[76] Inventor: Don M. Osborne, 10320 W. 17th Pl., Lakewood, Colo. 80215

[21] Appl. No.: 840,843

[22] Filed: Feb. 25, 1992

[51] Int. Cl.$^5$ .............................................. B01J 31/00
[52] U.S. Cl. ..................................... 502/158; 502/170
[58] Field of Search ................................ 502/158, 170

[56] References Cited

U.S. PATENT DOCUMENTS

| | | | |
|---|---|---|---|
| 3,177,633 | 4/1965 | McDonald | 55/100 |
| 4,099,943 | 7/1978 | Fischman et al. | 55/487 |
| 4,200,609 | 4/1980 | Byrd | 502/400 |
| 4,207,291 | 6/1980 | Byrd et al. | 502/400 |
| 5,112,796 | 5/1992 | Iannicelli | 502/400 |

FOREIGN PATENT DOCUMENTS 5251258  3/1983  Japan.

Primary Examiner—Patrick P. Garvin
Assistant Examiner—E. D. Irzinski
Attorney, Agent, or Firm—John E. Reilly

[57] ABSTRACT

An air filter is treated with a reactive functional organosilixane composition so as to increase the oxygen concentration in air drawn through a carburetor system of an internal combustion engine and is also directed to the method of treating a standard air filter of cellulosic material by intermixing an organosiloxane and metal salt catalyst with a volatile solvent, applying the solution in liquid form to the filter and draining and drying the filter until the solvent is evaporated on the surface of the filter.

16 Claims, 1 Drawing Sheet

CHEMICALLY TREATED AIR FILTER FOR ENRICHING THE OXYGEN PRESENT IN AN AIRSTREAM

Specification

This invention relates to air filters; and more particularly relates to a novel and improved method of enriching or increasing the oxygen concentration in air drawn through a carburetor or fuel injection system of an internal combustion engine by chemical treatment of the air filter and to a method of chemically treating or preparing an air filter for this purpose.

BACKGROUND AND FIELD OF INVENTION

Various methods and techniques have been devised for increasing the oxygen concentration in air which is drawn into a carburetor and mixed with fuel for an internal combustion engine. For example, Japanese Patent No. 58-51258 proposes to increase the concentration of oxygen in the suction air to the engine by absorbing nitrogen from the air. This is done by passing the air through a special cylinder in addition to the air filter, but does not act in place of an air filter in the simultaneous removal of particulate matter from the air.

In U.S. Pat. No. 4,099,943 to Fischman, there is disclosed an open cell foam used in combination with a layer of a non-woven fibrous material to serve as an air filter having a high capacity for retaining particulate matter. Fischman also proposes wetting the foam with minor proportions of a fluid selected from a number of silicone oils but not in combination with an organic solvent or catalyst, and is not intended for use as a filter in the removal of dust and other particulate matter.

U.S. Pat. No. 3,177,633 to McDonald, Jr. discloses an oxygen enricher for combustion engines by exposing air to a magnetic field, but does not replace the standard filter.

There is a continuing need for an efficient means of treating air as it is introduced into a carburetor to the end of enriching the oxygen content so that, for a given capacity or mass rate of flow into the carburetor, the amount of oxygen is substantially increased. When the oxygen concentration is increased, the fuel efficiency is increased and the pollutants are reduced. Furthermore, in treating the air, it is highly desirable that this be done without the addition of special accessories or equipment or of increasing the size of existing equipment needed for improving combustion efficiency by the expedient of replacing the standard air filter with a novel and improved air filter prepared and treated in accordance with the present invention.

SUMMARY OF INVENTION

It is therefore an object of the present invention to provide for a novel and improved method and means for increasing the oxygen concentration in air for mixing with fuel prior to introduction into an internal combustion engine.

It is another object of the present invention to provide for a novel and improved method for treating an automotive air filter so as to serve the dual function of removing particulate matter and increasing the oxygen concentration in air directly through the air filter thereby resulting in enhanced combustion efficiency and substantial reduction in harmful pollutants released from the engine.

It is a still further object of the present invention to provide for a novel and improved method for chemically treating air filters and to a method of preparing the chemical treatment compound and applying to an air filter.

An additional object of the present invention is to provide for a method of filtering air to substantially reduce the nitrogen present and in such a way as to increase the oxygen concentration in the air and the rate of introduction of oxygen for a given mass rate of flow of air through the filter.

In accordance with the present invention, an air filter has been devised for increasing the concentration of oxygen in an airstream which is directed through the filter and which filter comprises a layer of cellulosic material, and a film bonded to the cellulosic layer, the film being composed of an organosilicone, a solvent and a catalyst bonded to the cellulosic layer. Preferably, the organosilicone is selected from the group consisting of polymers and copolymers of polymethylhydrosiloxanes or from carboxypropylsilicone and is present in minor proportions by weight to the entire solution; and the catalyst is a metal salt catalyst also present in minor proportions by weight and effective to cause the organosilicone molecules to cross-link into bonded relation to the filter. The solvent is a volatile solvent which will evaporate once applied to the filter leaving the organosilicone in the form of a dry film on the filter paper.

A preferred application of the air filter is to replace the standard air filter in an internal combustion engine so that when interposed across the airstream being drawn through the air filter and into the carburetor will be effective to block the nitrogen molecules in the airstream thereby increasing the concentration of oxygen and reducing fuel consumption while at the same time reducing the amount of harmful pollutants released into the atmosphere from the exhaust.

The above and other objects, advantages and features of the present invention will become more readily appreciated and understood from a consideration of the following detailed description of a preferred embodiment of this invention when taken together with the accompanying drawings, in which:

DETAILED DESCRIPTION OF THE PREFERRED EMBODIMENT

Figure 1:
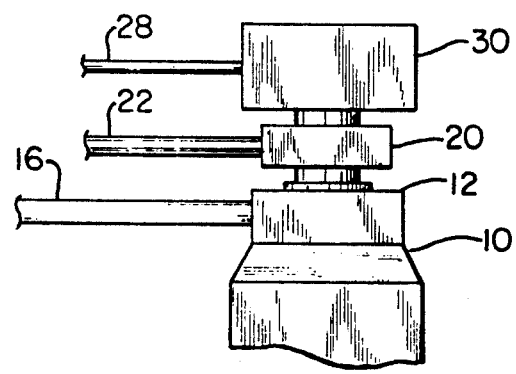
FIG. 1 is a schematic view illustrating the placement of an air filter treated in accordance with the present invention in the carburetor system of an automobile.

Referring in more detail to the drawings and, as a setting for the present invention, there is illustrated in FIG. 1 an internal combustion engine 10 which in accordance with conventional practice has an intake manifold 12 and exhaust manifold to direct spent combustion gases through an exhaust line 16 and muffler, not shown, into the atmosphere. A conventional carburetor 20 receives fuel from a fuel tank via line 22 for mixture with air which passes through an air filter 30 in housing 29 upstream of the intake manifold 12.

The air is drawn from an inlet line 28 through the air filter 30 which is prepared and chemically treated in accordance with the present invention whereby to increase the concentration of oxygen in the airstream as a preliminary to mixing with the fuel in the carburetor section. Hereinafter, although the invention is described for use specifically in conjunction with an internal combustion engine, it is conformable for use in other fuel/air injection systems or virtually any system in which it is desirable to reduce the ratio of nitrogen to oxygen in the airstream.

Figure 2:
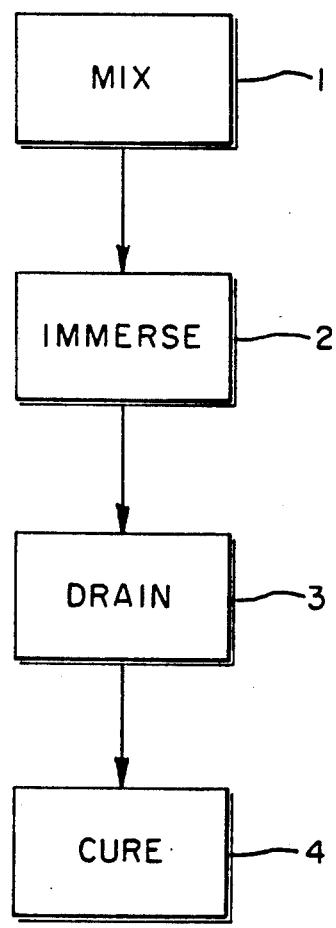
FIG. 2 is a block diagram illustrating the steps followed in the preparation of a novel and improved air filter in accordance with the present invention.

Referring to FIG. 2, the filter 30 of the present invention is made up of one or more layers of cellulose material and essentially may be any raw, untreated cellulose or oil-treated paper, such as, Model No. 46024 filter paper, manufactured and sold by Wicks Filter Corporation of Gastonia, North Carolina 28053-1967. In this connection, it is important that the filter be composed of a material which will become intimately united with or bonded to an ultrathin film which is applied to the layer by following the succession of steps as represented in FIG. 2. For example, it has been found that paper treated with acrylic or other coating compounds that cannot be stripped off of the paper are not suitable for use in uniting to the film. The structural properties of cellulose lend themselves particularly well for use in the present invention. Specifically, the OH (hydroxyl) sites on the cellulose fibers will react with functional organosiloxanes. These organosiloxanes are selected from the group consisting of carboxypropylsilicone and polymethylhydrosiloxane polymers as well as copolymers of the polymethylhydrosiloxanes; namely, methylhydrodimethylsiloxane, methylhydromethylcnyoprophysiloxane and methylhydromethyloctylsiloxane. It has been found that the silicone polymers and copolymers described are capable of reacting with hydroxyls on cellulose in the presence of accelerators, such as, metal salt catalysts, and in doing so will bond to the filter paper and in doing so will bond to the filter paper. The excess silicone then cross-links to form a film. In other words, the hydroxyl bonding is virtually instantaneous but the cross-linking requires additional time on the order of twentyfour hours at ambient temperature; however, this time period can be shortened by exposing to higher temperatures. Examples of suitable metal salt catalysts are tin octoate, zinc octoate, dibutyltindilaurate and iron octoate.

In the method of preparation of the treating solution, preferably organosilicone is introduced in the range of 0.5% to 10% by weight of the total solution and is dissolved in a volatile solvent. An appropriate solvent or carrier is a hydrocarbon or chlorinated liquid solvent, such as, hexane or freon. The metal salt catalyst is then introduced in concentrations of 0.2% to 2.0% by weight of the solution and is mixed into the solution. The intermixing of the materials is done at room temperature and the function of the catalyst is to start the cross-linking reaction as described within the organosilicone polymers or copolymers as represented in step 1 of FIG. 2.

In step 2, a filter paper or layer is composed of a cellulose material, which is free of any coating or coated with a material which is soluble in the solvent, is then immersed in the mixture for a short period of time on the order of three minutes or until all of the air is expelled from the fiber matrix of the filter paper.

Following immersion, in step 3, any excess solution on the filter is drained; and in step 4 the filter is then hung up to cure or dry overnight at room temperature, or the cross-linking or cure may be accelerated by heating into the range of 50° C. to 150° C. Nevertheless, the preferred drying step is done at room temperature over a 24-hour period in which all of the volatile solvents will evaporate from the filter leaving an ultrathin film of silicone within the fiber matrix.

In the preferred reaction, the main reaction components are cellulose and silicone. The structure for cellulose is as follows:

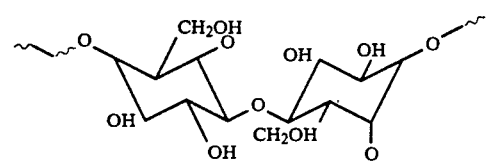

For silicone, the structure may be represented as follows:

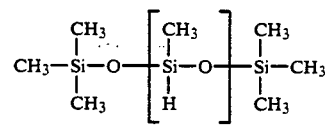

The primary reaction between the cellulose and silicone may be represented as follows:

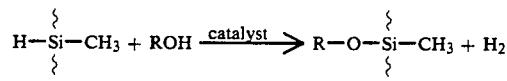

The secondary reaction which occurs in the cross-linking of the silicone molecules is as follows:

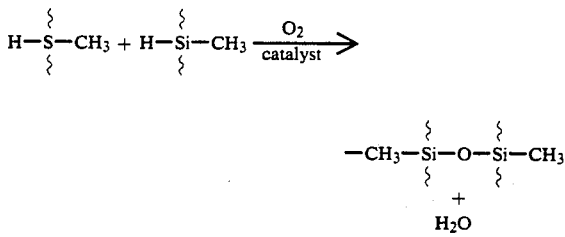

The following examples are given by way of illustration but not limitation on the formulation of different organosiloxane solutions for application to filter paper.

EXAMPLE I

A catalyst was combined together with a solvent and silicone polymer in the following proportions by weight:

| | |
|---|---|
| Hexane | 94.9% |
| Dibutyltindilaurate | 0.01% |
| Polymethylhydrogensiloxane | 5.0% |

The ingredients were mixed at room temperature and a cellulose filter was immersed in the solution for a period of three minutes. After removal from the solution, it was permitted to dry but exhibited a very slow cure rate.

EXAMPLE II

A solution was prepared in the following proportions by weight:

| Hexane | 98.5% |
|---|---|
| Dibutyltindilaurate | 0.5% |
| Polymethylhydrogensiloxane | 1.0% |

The cure rate exhibited by the solution after application to the filter was acceptable and occurred at room temperature within 24 hours; however, the film left after evaporation of the solvent was not completely bonded to the filter layer.

EXAMPLE III

Another solution was prepared with the following proportions by weight:

| Hexane | 69.5% |
|---|---|
| Dibutyltindilaurate | 0.5% |
| Polymethylhydrogensiloxane | 30% |

After immersion of the filter in the solution and drying, the cure rate was acceptable but resulted in an extremely thick skin or film which substantially reduced the flow rate of air through the filter.

EXAMPLE IV

A solution was prepared by mixing the ingredients in the following ratio by weight:

| Polymethylhydrosiloxane | 5.0% |
|---|---|
| Dibutyltindilaurate | 0.5% |
| Hexane | 94.5% |

As in the solutions of the first three examples, the hexane was first introduced or mixed with the polymethylhydrosiloxane followed by the catalyst which was added to start the reaction. The filter was soaked for a period of two to four minutes and then hung up to dry at room temperature (18° C. to 30° C.) After the solvent had evaporated, an ultrathin dry film was left on the fibrous matrix of the filter layer and firmly united to the filter layer.

A filter 30 prepared in accordance with Example IV was placed in the inlet to a carburetor in place of the standard air filter. Comparative testing was done in an automobile with measurements taken of rear wheel horsepower, hydrocarbon and carbon monoxide emissions at the exhaust when used with a standard filter versus a treated filter in accordance with the present invention. Increased horsepower was realized together with a reduction in hydrocarbons and carbon monoxide produced at the exhaust when the treated filter was employed. Equally as important, enrichment of the oxygen in the airstream produced increased gas mileage. As expected, the increase in gas mileage varied with the speeds at which the car was driven, weather and highway conditions. Nevertheless, in testing under controlled conditions, increases in gas mileage in the range of 5% to 10% were realized.

From the foregoing, the application of the film to the air filter results in passing oxygen molecules through the paper at a much faster rate than nitrogen. In this relation, it is important that the film be ultrathin and, for example, may be 300 angstroms in thickness and preferably is less than 500 angstroms so as not to impede the mass flow rate of oxygen therethrough but at the same time effectively block the larger nitrogen molecules. The application of the ultrathin film in bonded relation to an air filter has been found to achieve the dual function of filtering out solid particles from the air while at the same time blocking the passage of nitrogen molecules without significantly altering or reducing the total mass rate of flow through the filter. As a suitable alternative, the organosiloxane solution may be applied by spraying onto the surface of the filter and then permitting to dry into bonded relation to the filter. In either form, the resultant filter can be washed in a detergent solution and reused without losing its properties.

For the purpose of illustration and not limitation, the optimum range in porosity of the filter paper may be expressed in the ratio of standard cubic feet per minute of air (SCFM) in relation to filter area (FT$^2$) multiplied by inches H$_2$O vacuum (PSIG). Thus, $$\frac{300 \ SCFM}{3.8 \ FT^2 \times 1.8 \ PSIG} = 43.8.$$

That ratio of 43.8 multiplied by 50% of measured porosity equals 21.9 and 43.8 multiplied by 115% of measured porosity equals 50.37. Accordingly, the optimum range for the porosity of the filter paper is between 21.9 and 50.37.

It is therefore to be understood that various modifications and changes may be made in the proportions of ingredients constituting the film as well as the particular method of application to a filter without departing from the spirit and scope of the present invention as defined by the appended claims and reasonable equivalents thereof.

I claim:

1. An air filter for increasing the concentration of oxygen in an airstream directed through said filter comprising:
   a layer of cellulosic material, and
   a film bonded to said cellulosic layer, said film being composed of an organosilicone, solvent and catalyst bonded to said cellulosic layer.

2. An air filter according to claim 1, said organosilicone selected from a group consisting of carboxypropylsilicone and polymethylhydrosiloxanes.

3. An air filter according to claim 2, said organosilicone selected from polymers and copolymers of polymethylhydrosiloxanes.

4. An air filter according to claim 1, said organosilicone being present in minor proportions by weight to said solvent.

5. An air filter according to claim 1, said organosilicone and catalyst constituents being present in minor proportions by weight to said solvent.

6. An air filter according to claim 1, said film prepared from a solution in which said organosilicone is present in the amount of 0.5% to 10% by weight of the solution.

7. An air filter according to claim 6, said catalyst being a metal salt selected from the group consisting of zinc octoate, tin octoate, iron octoate and dibutyltindilaurate.

8. An air filter according to claim 7, said metal salt catalyst being present in said solution in the range of 2.0% to 20% by weight to the weight of said solution.

9. An air filter for increasing the concentration of oxygen in an airstream drawn through the carburetor system of an internal combustion engine comprising:
a layer of cellulosic material, and
a film bonded to said cellulosic layer and which film is composed of an organosilicone, solvent and catalyst bonded to said cellulosic layer, said organosilicone selected from the group consisting of carboxypropylsilicone and polymethylhydrosiloxanes, and said organosilicone and catalyst constituents being present in minor proportions by weight to said solvent.

10. An air filter according to claim 9, said film prepared from a solution in which said organosilicone is present in the amount of 0.5% to 10% by weight of the solution.

11. An air filter according to claim 9, said catalyst being a metal salt selected from the group consisting of zinc octoate, tin octoate, iron octoate and dibutyltindilaurate.

12. The method of treating an air filter wherein filter paper is composed of a cellulosic material, comprising the steps of:
  (1) intermixing organosilicone and a metal salt catalyst with a volatile solvent thereby resulting in a solution containing 0.5% to 10% by weight of the organosilicone;
  (2) applying said solution in liquid form to said filter; and
  (3) drying said filter until said solvent is evaporated thereby forming an ultrathin solid film of said organosilicone on said filter.

13. The method according to claim 12, wherein said solution is applied by immersing said filter in said solution.

14. The method according to claim 12, wherein said solution is applied by spraying onto said cellulosic filter material.

15. The method according to claim 12, said organosilicone selected from the group consisting of carboxypropylsilicone and polymethylhydrosiloxanes.

16. The method according to claim 12, said organosilicone selected from polymers and copolymers of polymethylhydrosiloxanes.

* * * * *